Oct. 3, 1933.　　　O. SCHMIDT　　　1,929,290
PHOTOGRAPHIC PLATE OR FILM
Filed July 1, 1929
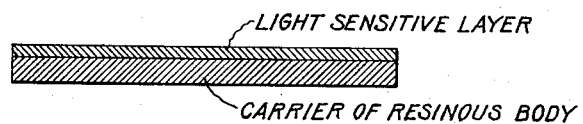
Inventor:
Oskar Schmidt,
by Charles E. Tullar
His Attorney.

Patented Oct. 3, 1933

1,929,290

UNITED STATES PATENT OFFICE 1,929,290

PHOTOGRAPHIC PLATE OR FILM

Oskar Schmidt, Berlin-Tegel, Germany, assignor to General Electric Company, a corporation of New York Application July 1, 1929, Serial No. 375,330, and in Germany July 12, 1928

2 Claims. (Cl. 95—9)

This invention relates to photographic plates or films, and particularly to the use of artificial resins as carriers for the light sensitive layers on such plates or films.

An object of this invention is to produce an improved photographic plate or film which is flexible, which may be transparent, and which has a low fire hazard.

Another object of this invention is to produce a photographic plate or film in which the carrier of the light sensitive layer is composed solely of a resinous body.

It is highly desirable that a photographic plate, or film, be non-inflammable and unbreakable. It is also often desirable that such a plate or film be transparent and flexible. If the carrier for the light sensitive layer of a photographic plate, or film, is composed of an artificial resin, or resinous product these desirable features may be attained.

The accompanying drawing illustrates diagrammatically and by way of example a photographic film or plate in accordance with my invention.

In carrying out my invention I may employ a number of artificial resins as the carrier of the light sensitive layer. For example, I may use the condensation products of univalent or multivalent phenols, or their homologues, and formaldehyde and acetaldehyde. Such artificial resins are usually slightly yellowish in color. I may also use such resins as are obtained by the condensation of polybasic acids, or their anhydrides, with polyhydric alcohols. For example, I may use the condensation product obtained by the reaction of glycerine and phthalic anhydride. The condensation products of polybasic acids, or other anhydrides, with polyhydric alcohols may be transparent, and hence particularly suitable in the manufacture of transparent plates or films. Such condensation products may also be made flexible in their character. Other suitable alcohols and acids besides glycerine and phthalic anhydride, as mentioned, may be used equally as well, and also monobasic acids and univalent alcohols may be used in combination with polyhydric alcohols and polybasic acids in producing the resinous complexes suitable for use in this invention.

Another class of artificial resins which may be used in carrying out this invention are the resins of the urea-formaldehyde type, that is, resins formed by the reaction of urea or substituted ureas, and formaldehyde or other aldehydes.

If it is not desired to have a photographic plate, or film, which is permeable to light, artificial resins that are not clearly transparent may also be used for carriers of this type. In this case various fillers may be added to the artificial resin, such, for example, as organic or inorganic fibrous substances in the form of individual fibres, or tissues, or such inorganic ground fillers as glass or mica, may be used.

The carrier may be subjected in a well known manner to the influence of pressure and heat, or heat alone, in order to harden the artificial resin. This operation may be carried out either during, or after the making of the carrier.

In order to increase the flexibility of the film, a suitable plasticizing material, or softening agent, examples of which are well known, may be appropriately added.

Photographic plates, or films of this character have the advantage over those in which glass or celluloid is used as the carrier for the light sensitive medium, in that they can not easily be broken and are practically non-inflammable.

If colored plates, or films, are desired, the condensation products may be provided with coloring material if the resin is clear and colorless, or a colored, artificial resin may be used.

By the term photographic plate or film as herein used, I mean to include not only such plates or films which are particularly sensitive to light rays, but also plates or films which are sensitive to other types of ray, such as, for example, X-rays.

What I claim as new and desire to secure by Letters Patent of the United States is:

1. A transparent, flexible photographic film comprising the combination of a carrier consisting of a flexible condensation product of a polyhydric alcohol and a polybasic acid, and a light sensitive layer thereon.

2. A photographic plate comprising the combination of a carrier consisting of a condensation product of the polyhydric alcohol-polybasic acid type admixed with a filler and hardened under heat and pressure, and a light sensitive layer thereon.

OSKAR SCHMIDT.